United States Patent
Choi

[19]

[11] Patent Number: 5,923,543
[45] Date of Patent: Jul. 13, 1999

[54] RESONANCE-TYPE POWER SWITCHING DEVICE

[75] Inventor: Seoung Choi, Suwon, Rep. of Korea

[73] Assignee: SamSung Electronics Co., Ltd., Suwon, Rep. of Korea

[21] Appl. No.: 08/989,217

[22] Filed: Dec. 11, 1997

[30] Foreign Application Priority Data

Dec. 14, 1996 [KR] Rep. of Korea ................ 96-65951

[51] Int. Cl.⁶ .................... H02M 3/335; H02M 3/24; G05F 1/40
[52] U.S. Cl. .................. 363/21; 363/19; 363/97
[58] Field of Search ................. 363/21, 20, 19, 363/18, 37, 97, 131; 323/282, 284

[56] References Cited

U.S. PATENT DOCUMENTS

| | | | |
|---|---|---|---|
| 4,654,771 | 3/1987 | Stasch et al. .......................... 363/19 |
| 4,866,589 | 9/1989 | Satoo et al. .......................... 363/21 |
| 4,901,215 | 2/1990 | Martin-Lopez . | |
| 4,937,468 | 6/1990 | Shekhawat et al. . | |
| 5,045,712 | 9/1991 | Baggenstonss . | |
| 5,159,541 | 10/1992 | Jain . | |
| 5,287,262 | 2/1994 | Klein . | |
| 5,317,496 | 5/1994 | Seiersen . | |
| 5,438,500 | 8/1995 | Ohms . | |
| 5,515,258 | 5/1996 | Viertler . | |
| 5,546,294 | 8/1996 | Schutten et al. . | |
| 5,559,684 | 9/1996 | Ohms et al. . | |
| 5,572,418 | 11/1996 | Kimura et al. . | |
| 5,654,881 | 8/1997 | Albrecht et al. . | |
| 5,661,642 | 8/1997 | Shimashita ............................. 363/21 |

Primary Examiner—Peter S. Wong
Assistant Examiner—Rajnikant B. Patel
Attorney, Agent, or Firm—Robert E. Bushnell, Esq.

[57] ABSTRACT

A resonance-type power switching device includes: a power controller for producing a power control pulse, main and auxiliary switches for generating switching power in response to the power control pulse, and a control pulse advancing circuit for advancing the generation of the power control pulse by a preset time interval and for supplying the advanced generation of the power control pulse to the auxiliary switch in advance, such that a drive signal is generated to provide an off time interval between the turn-on of the main switch and the turn-on of the auxiliary switch to effect resonance during the off time interval.

7 Claims, 4 Drawing Sheets

FIG. 2A PWM OUT

FIG. 2B TIME DELAY

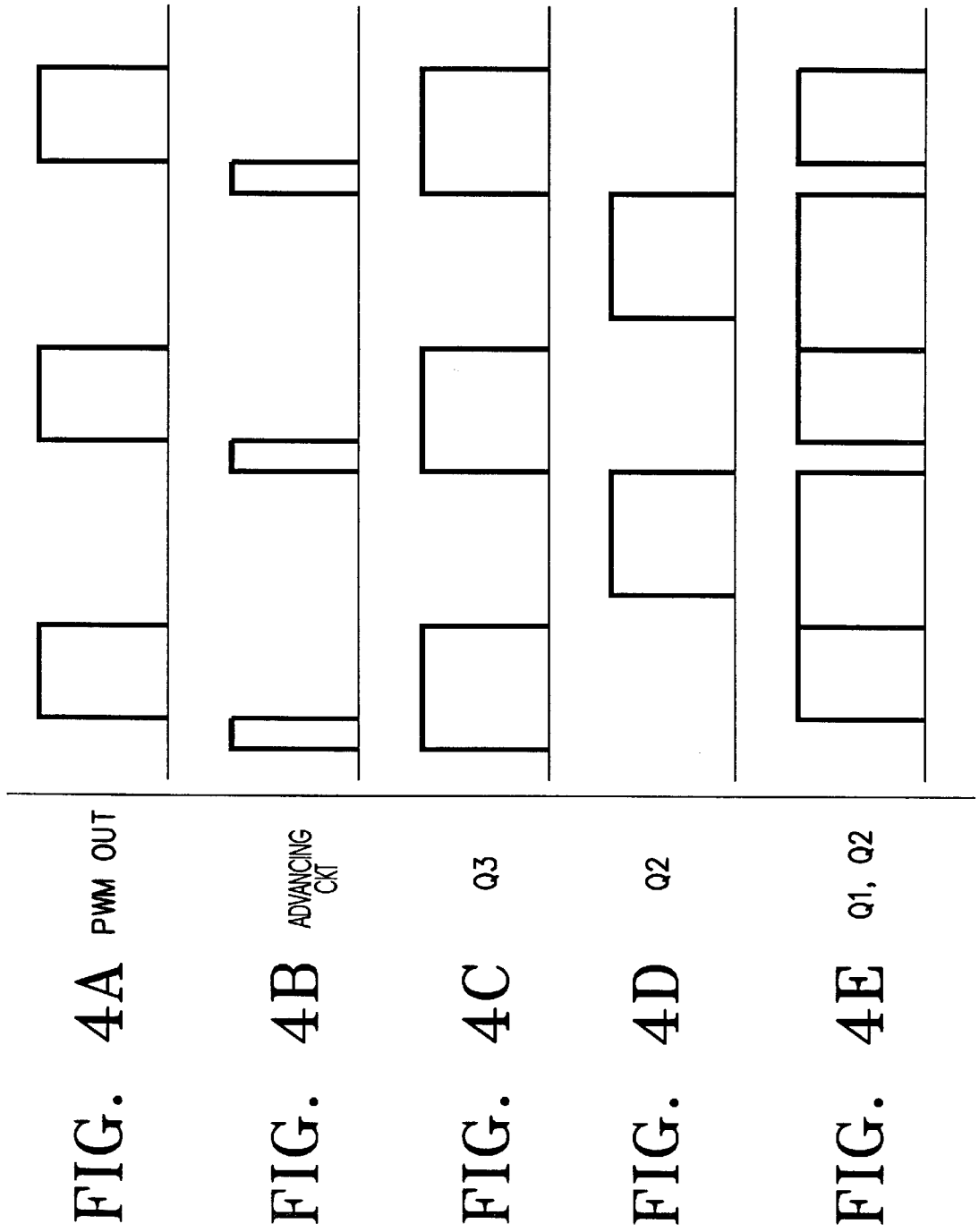

RESONANCE-TYPE POWER SWITCHING DEVICE

CLAIM OF PRIORITY

This application makes reference to, incorporates the same herein, and claims all benefits accruing under 35 U.S.C. §119 from an application for RESONANCE-TYPE POWER SWITCHING DEVICE earlier filed in the Korean Industrial Property Office Dec. 14, 1996 and there duly assigned Ser. No. 65951/1996.

BACKGROUND OF THE INVENTION

1. Field of the Invention

The present invention relates to power switching processes and devices, and more particularly, to resonance-type power switching techniques and devices.

2. Description of the Related Art

Generally, a switching mode power supply (SMPS) is a DC-DC converter constructed with a string of switching elements and a switching controller for controlling the switching operation of the switching elements. Recent designs found in the art include U.S. Pat. No. 5,654,881 issued to Albrecht et al., entitled Extended Range DC-DC Power Converter Circuit, U.S. Pat. No. 5,559,684 issued to Ohms et al., entitled Switching Regulator, U.S. Pat. No. 5,515,258 issued to Viertler, entitled Drive Device For A Push-Pull Stage, U.S. Pat. No. 5,438,500 issued to Ohms, entitled Switching Regulator With A Push-Pull Resonance Converter, U.S. Pat. No. 5,045,712 issued to Baggenstoss, entitled Synchronized Switched Mode Power Supplies, U.S. Pat. No. 4,937,468 issued to Shekhawat et al., entitled Isolation Circuit For Pulse Waveforms, U.S. Pat. No. 5,159,541 issued to Jain, entitled Asymmetrical Pulse Width Modulated Resonant DC/DC Converter, U.S. Pat. No. 5,317,496 issued to Seiersen, entitled DC/DC-Converter With A Primary Circuit And At Least One Secondary Circuit Tuned As Individually Oscillatory Circuits, U.S. Pat. No. 4,901,215 issued to Martin-Lopez, entitled Isolated Switch Mode Power Supply Controller, U.S. Pat. No. 5,287,262 issued to Klein, entitled High Voltage Resonant Inverter For Capacitive Load, U.S. Pat. No. 5,572,418 issued to Kimura et al., entitled Quasi-Resonant PWM Inverter, and U.S. Pat. No. 5,546,294 issued to Schutten et al., entitled Resonant Converter With Wide Load Range.

In the practice in the art represented by these designs, the switching mode power supply is a DC power supply which regulates the average current applied to loads by changing the interrupting period (ON/OFF time within a period) by means of the switching controller. However, since the switching frequency of the switching mode power supply can not be made faster without limit, there is a limit as to designing the power supply device so as to be as small as possible. That is, the switching mode power supply can not be implemented as a power supply device of higher efficiency. Therefore, it is a problem that the power supply device becomes larger in size, in order to produce the desired power level. Therefore, if the switching mode power supply can generate the switching frequency at a high frequency, then the same can be implemented as a high-efficiency SMPS with a small size. In order to eliminate such problems, a power switching device of a resonant converter type generating a high switching frequency has been proposed. Such a power switching device of a resonant converter type adopts a partial resonance mode applied to the entire power supply device in which two switching elements must be operated at specified time intervals in order that such a partial resonance circuit can be normally operated.

In a resonant type power switching device, a start-up circuit produces trigger signals which are supplied to a pulse width modulation (PWM) controller at the time of initial start-up. The PWM controller produces a PWM signal for generating power in response to the trigger signal transferred from the start-up circuit at the time of initial start-up and after start-up produces PWM signals depending upon the switching of a phototransistor of a photocoupler. Such a PWM signal is a power control signal for generating switching power. A time delay delays the PWM signal prior to further transmitting it. A transistor forms a main switch which is connected between a primary transformer winding and a ground terminal and a gate electrode of the transistor is connected to an output terminal of the time delay. The main switch transistor is switched by the delayed PWM signal from the time delay, thereby generating switching power. A capacitor is connected between the primary transformer winding and the ground terminal in parallel to the main switch transistor.

The primary transformer winding has one end connected to the input terminal and has another end connected to the ground terminal via a diode and capacitor. The cathode electrode of the diode is connected to a supplementary transformer winding. Another transistor is connected between the input terminal and a capacitor serially connected to a resistor and further connected to a primary transformer winding. A gate electrode of the other transistor is connected to the input terminal of the PWM controller. An auxiliary switch transistor is connected between the supplementary transformer winding and the input terminal and a gate electrode of the supplementary transistor is connected to an output terminal of the other transistor. The auxiliary switch transistor is switched in response to the output of the other transistor to generate supplementary power.

Diodes and a capacitor, both connected to the secondary transformer winding, rectify and smooth the switching power induced in the secondary transformer winding. Additional resistors and a programmable reference diode compare the output power with a reference voltage and a photocoupler generates a switching pulse by means of the programmable reference diode.

The PWM controller produces a PWM signal for generating switching power and is applied to the other transistor and at the same time to the time delay thereby being delayed by a preset time prior to being further supplied to the main switching transistor. Then, the auxiliary switching transistor produces a switching signal in response to the switching of the other transistor.

The PWM controller initiates the power generating function of the entire device and the PWM signal applied to the main switching transistor is delayed by means of the time delay so as to main a specified off time interval after the other transistor is turned off in order to effect resonance operation. That is, in order to effect a partial resonance operation, the power switching device comprises the main switching transistor and the auxiliary switching transistor whereby an off time interval is arranged so as not to simultaneously turn on both of these transistors when driving them. For such a purpose, earlier power switching devices set a time delay when driving the main switching transistor.

These transistors are field effect transistors however, and in order to drive these switches, a high power drive circuit is needed. It is therefore very difficult to satisfy such high power driving and at the same time delay gate pulses by a necessary time interval.

I have discovered that the art fails to provide a power switching device capable of generating an off time interval by transferring a power control signal to the auxiliary switch in advance by a preset time interval.

SUMMARY OF THE INVENTION

It is an object of present invention to provide an improved electrical power switching process and device.

It is another object to provide a power switching process and device capable of transferring a power control signal to an auxiliary switch in advance by a preset time interval.

It is still another object to provide a power switching process and device capable of generating an off-time interval by transferring a power control signal to an auxiliary switch in advance by a preset time interval.

These and other object may be achieved according to the present invention, a resonance-type power switching device using a power controller for producing a power control pulse, main and auxiliary switches for generating switching power in response to the power control pulse, and a control pulse advancing circuit for advancing the generation of the power control pulse by a preset time interval to further apply the advanced generation of the power control pulse to the auxiliary switch in advance, whereby a drive signal is generated to provide an off time interval between the turn-on of the main switch and the turn-on of the auxiliary switch to effect resonance during the off time interval.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 4A–4E constitute a waveform diagram illustrating the operating characteristics of the constituent elements of the device depicted in FIG. 3.

DETAILED DESCRIPTION OF THE PREFERRED EMBODIMENT

Figure 1:
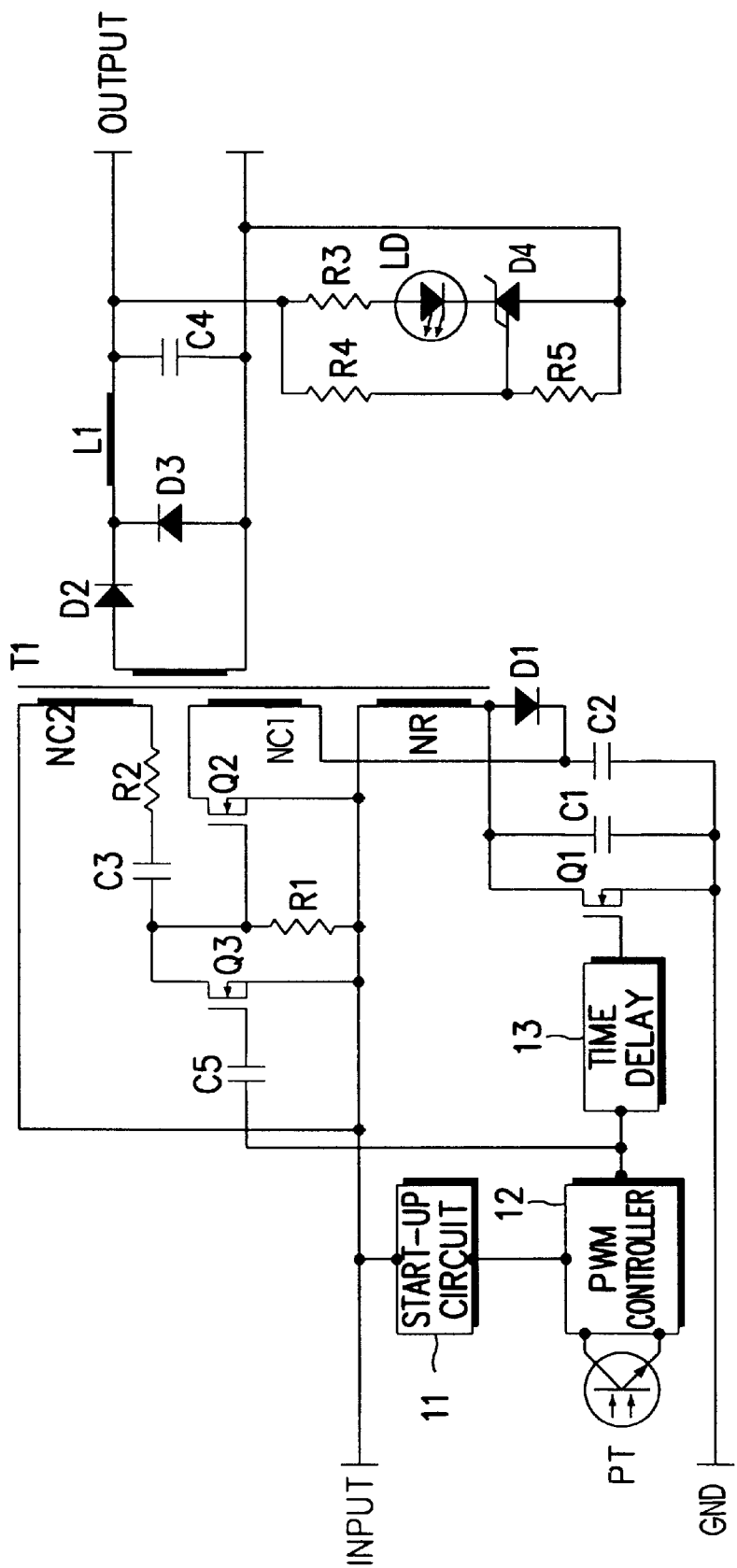
FIG. 1 is a diagram illustrating an earlier resonant type power switching device.

Referring to FIG. 1, a start-up circuit 11 produces trigger signals which are applied to a pulse width modulation (PWM) controller 12 at the time of initial start-up. The PWM controller 12 produces a PWM signal for generating power in response to the trigger signal transferred from the start-up circuit 11 at the time of initial start-up, and after start-up, produces PWM signals depending on the switching of a phototransistor PT of a photocoupler. The PWM controller 12 can employ a model "FA5310" component manufactured and marketed by, for example, Fuji Co., Ltd in Japan. Such a PWM signal is a power control signal for generating switching power. A time delay 13 delays the PWM signal to further transmit the same. A transistor Q1 is a main switch which is connected between primary transformer winding NR and a ground terminal, and a gate electrode of the transistor Q1 is connected to an output terminal of the time delay 13. The transistor Q1 is switched by the delayed PWM signal from the time delay 13, thereby generating switching power. A capacitor C1 is connected between the primary transformer winding NR and the ground terminal in parallel to transistor Q1.

The primary transformer winding NR has one end connected to the input terminal and has another end connected to the ground terminal via diode D1 and capacitor C2. A cathode electrode of diode D1 is connected to a supplementary transformer winding NC1. A transistor Q3 is connected between the input terminal and a capacitor C3 serially connected to resistor R2 and further connected to a primary transformer winding NC2, and a gate electrode of the transistor Q3 is connected to the input terminal of the PWM controller 12. A transistor Q2, used as an auxiliary switch, is connected between the supplementary transformer winding NC1 and the input terminal, and a gate electrode of transistor Q2 is connected to an output terminal of the transistor Q3. The transistor Q2 is switched in response to the output of transistor Q3 to generate supplementary power.

The transistor Q1, capacitor C1, primary transformer winding NR, transistor Q2, capacitor C2, and supplementary transformer winding NC1 constitute a partial resonance circuit of the power switching device. Diodes D1–D2 and capacitor C4, both connected to the secondary transformer winding, rectify and smooth the switching power induced in the secondary transformer winding. Resistors R3–R5 and a programmable reference diode D4 compare the output power with a reference voltage, and a photocoupler LD generates a switching pulse by means of the diode D4.

Figure 2:
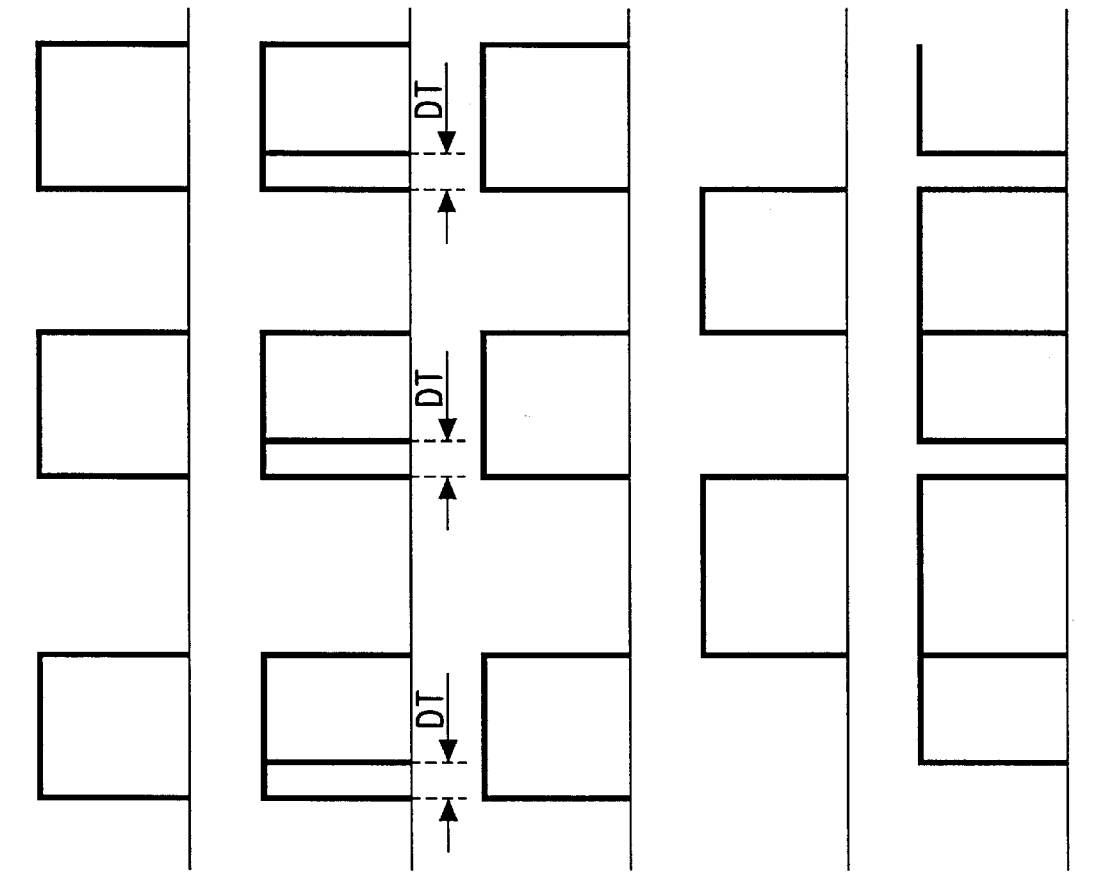
FIGS. 2A–2E constitute a waveform diagram illustrating the operating characteristics of the constituent elements of the device depicted in FIG. 1.

As for the operation of the power switching device as shown in FIG. 1, the PWM controller 12 produces a PWM signal for generating switching power as depicted in FIG. 2A. The PWM signal is applied to transistor Q3 and at the same time to the time delay 13 as shown in FIG. 2C, thereby being delayed by a preset time DT so as to be further applied to transistor Q1 as shown in FIG. 2B. Then, the transistor Q2 produces a switching signal by switching of transistor Q3 as shown in FIG. 2C. Accordingly, the final output signals of transistor Q1 and transistor Q2 are produced in the form as shown in FIG. 2E.

The power switching device as shown in FIG. 1 is configured in such way that the output signal of the PWM controller 12 initiates the power generating function of the entire device, and the PWM signal applied to transistor Q1 is delayed by means of the time delay 13 so as to maintain a specified off time interval after the transistor Q2 is turned off in order to effect a resonance operation. That is, in order to effect a partial resonance operation, the power switching device comprises transistor Q1 used as a main switch and transistor Q2 used as a auxiliary switch for clamping, whereby an off time interval is arranged so as not to simultaneously turn on both transistors Q1 and Q2 when driving them. For such a purpose, the earlier power switching device is designed so as to set delay time when driving the main switch (i.e., transistor Q1).

Transistors Q1–Q3 however, are used as main and auxiliary switches in the above power switching device are FETs (field effect transistors), and in order to drive these switches, a high-power drive circuit is needed. It is therefore very difficult to satisfy such high-power driving and at the same time to delay gate pulses by a necessary time interval. Accordingly, in case of setting off time interval in the abovenoted method, the power switching device generating a PWM signal at a high speed for the switching operation must have a complicated circuit configuration, causing great difficulty in developing the power switching device.

Figure 3:
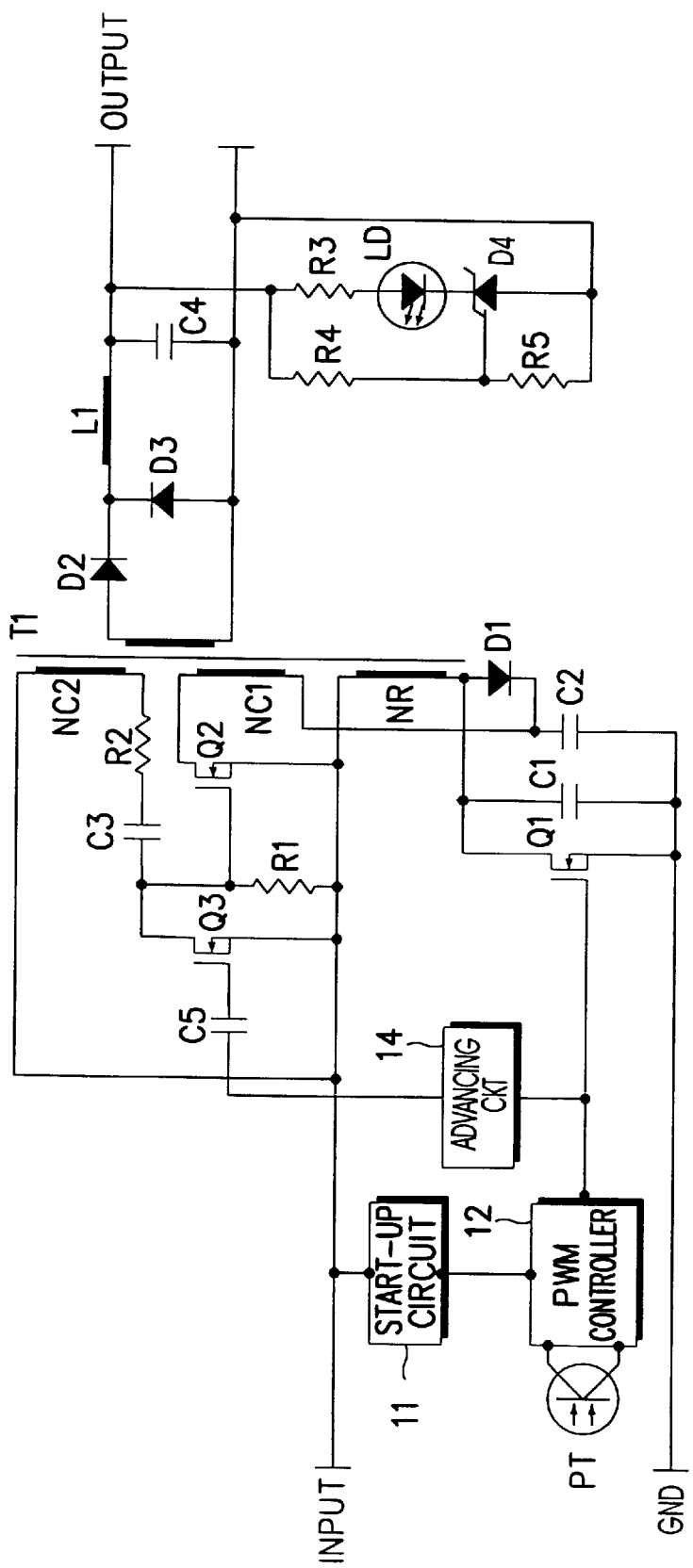
FIG. 3 is a diagram illustrating a resonant type power switching device constructed according to the principles of the present invention as an embodiment of the present invention.

Referring now to FIG. 3, the start-up circuit 11 produces trigger signals which are applied to the pulse width modulation (PWM) controller 12 at the time of initial start-up. The PWM controller 12 produces a PWM signal for generating power in response to the trigger signal transferred from the start-up circuit 11 at the time of initial start-up, and after start-up, produces PWM signals depending on the switching of phototransistor PT of a photocoupler. The PWM controller 12 can employ a model "FA5310" component manufactured and marketed by FUJI Co. Ltd in Japan. Such a PWM signal is a power control signal for generating switching power. The transistor Q1 is a main switch which is connected between primary transformer winding NR and a ground terminal, and the gate electrode of transistor Q1 is connected to the output terminal of the PWM controller 12. The transistor Q1 is switched by the PWM signal from the PWM controller 12, thereby generating switching power. The capacitor C1 is connected between primary transformer winding NR and grounding terminal in parallel to transistor Q1.

The primary transformer winding NR has one end connected to the input terminal and has another end connected to the ground terminal via diode D1 and capacitor C2. The cathode electrode of diode D1 is connected to supplementary transformer winding NC1. The control pulse advancing circuit 14 generates the PWM signal by advancing it by a specified time interval. That is, the control pulse advancing circuit 14 performs a time advance function to control the PWM signal to let it lead the output signal from the PWM controller 12 by a specified time interval. The transistor Q3 is connected between the input terminal and capacitor C3 serially connected to resistor R2 and further to auxiliary transformer winding NC2 on primary side, and the gate electrode of transistor Q3 is connected to the output terminal of the control pulse advancing circuit 14. The transistor Q2, used as an auxiliary switch, is connected between the transformer winding NC1 and the input terminal, and the gate electrode of transistor Q2 is connected to the output terminal of the transistor Q3. The transistor Q2 is switched in response to the output of transistor Q3 to generate supplementary power.

The transistor Q1, capacitor C1, primary transformer winding NR, transistor Q2, capacitor C2, and supplementary transformer winding NC1 constitute a partial resonance circuit of the power switching device. Diodes D2–D3 and capacitor C4 are both connected to the secondary winding of the transformer and rectify and smooth the switching power induced in the secondary winding of the transformer. The resistors R3–R5 and the programmable reference diode D4 compare the output power with a reference voltage, and the photocoupler LD generates switching pulses by means of the diode D4.

Referring to the construction of the device illustrated by FIG. 3, the resonance-type power switching device is designed so as to apply the PWM signal implementing high-power driving signal as is to the transistor Q1, while the PWM signal being applied to transistor Q2 leads by a specified time interval. As a result, a faster signal with respect to the gate signal of the transistor Q1 (main switch) is applied to the transistor Q2 (i.e., auxiliary switch).

To explain the operation of the resonance-type power switching device with reference to FIG. 4, the PWM controller 12 produces PWM signal for generating switching power as shown in FIG. 4A. When receiving the PWM signal, the control pulse advancing circuit 14 produces a signal leading by a specified time interval with respect to the PWM signal. Accordingly, the transistor Q3 is switched by the PWM signal leading by a specified time interval, thereby generating output signal as shown in FIG. 4C, whereby the transistor Q2 (i.e., auxiliary switch) produces an output signal as shown in FIG. 4D. Finally, the ON/OFF time period of the transistors Q1 and Q2 becomes as shown in FIG. 4E.

Accordingly in order to effect the resonance operation as depicted in FIG. 4E, the preferred embodiment of the present invention applies the basic PWM signal as is to the transistor Q1, and besides, produces a time advanced signal leading by a specified time interval and applies it to transistor Q3, thereafter supplying the converted signal to transistor Q2. As a result, the transistor Q1 (i.e.,main switch) and transistor Q2 (i.e., auxiliary switch) are satisfied with the offtime interval required for the resonance operation and switched.

As described above, the resonance-type power switching device according to the embodiment of the present invention converts the time delay mode into the time advance mode, thereby eliminating the delay circuit of the high-power driving circuit and thus facilitating the implementation of the resonance-type power switching device.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A resonance-type power switching device, comprising:
   a power controller for producing a power control pulse;
   main and auxiliary switches for generating switching power in response to said power control pulse; and
   a control pulse advancing circuit for advancing the generation of said power control pulse by a preset time interval and for supplying the advanced generation of said power control pulse to said auxiliary switch in advance, such that a drive signal is generated to provide an off time interval between the turn-on of said main switch and the turn-on of said auxiliary switch to effect resonance during said off time interval.

2. A resonance-type power switching device, comprising:
   a power controller for producing a power control pulse;
   a start-up circuit for operating said power controller;
   a main switch connected to a primary winding of a power transformer for generating switching power in response to said power control pulse from said power controller;
   an auxiliary switch driver connected to an auxiliary winding of said power transformer;
   an advancing circuit connected to said power control for providing an advanced power control pulse advanced from said power control pulse by a preset time interval;
   said advanced power control pulse being fed to said auxiliary switch driver;
   an auxiliary switch being controlled by said auxiliary switch driver and connected to a supplementary winding of said power transformer such that a drive signal is generated to provide an off time interval between the turn on of said main switch and the turn on of said auxiliary switch to effect resonance during said off time interval;

a secondary winding of said power transformer being connected to a diode rectifier circuit and a filter circuit for providing a rectified and filtered DC output voltage; and a resistor circuit and a programmable reference diode connected to a photocoupler and said DC output voltage for generating switching pulses which are fed back to said power controller via said photocoupler.

3. The device of claim 1, said main switch comprising a field effect transistor.

4. The device of claim 2, said main switch comprising a field effect transistor.

5. The device of claim 1, said auxiliary switch comprising a field effect transistor.

6. The device of claim 2, said auxiliary switch comprising a field effect transistor.

7. The device of claim 2, said auxiliary switch driver comprising a field effect transistor.

* * * * *